US012313590B2

United States Patent
Mizuhata et al.

(10) Patent No.: US 12,313,590 B2
(45) Date of Patent: May 27, 2025

(54) ZETA POTENTIAL MEASUREMENT METHOD AND MEASUREMENT DEVICE

(71) Applicants: NATIONAL UNIVERSITY CORPORATION KOBE UNIVERSITY, Kobe (JP); MURATA MANUFACTURING CO., LTD., Kyoto (JP)

(72) Inventors: Minoru Mizuhata, Hyogo (JP); Izaya Okae, Kyoto (JP)

(73) Assignees: Kobe University, Hyogo (JP); Murata Manufacturing, Co., Ltd., Kyoto (JP)

( * ) Notice: Subject to any disclaimer, the term of this patent is extended or adjusted under 35 U.S.C. 154(b) by 163 days.

(21) Appl. No.: 18/240,220

(22) Filed: Aug. 30, 2023

(65) Prior Publication Data

US 2023/0408445 A1  Dec. 21, 2023

Related U.S. Application Data

(63) Continuation of application No. PCT/JP2022/010701, filed on Mar. 10, 2022.

(30) Foreign Application Priority Data

Mar. 13, 2021  (JP) ................................. 2021-040878

(51) Int. Cl.
  *G01N 27/60*  (2006.01)
(52) U.S. Cl.
  CPC .................................... *G01N 27/60* (2013.01)
(58) Field of Classification Search
  CPC .................................................... G01N 27/60
  (Continued)

(56) References Cited

U.S. PATENT DOCUMENTS 6,142,610 A * 11/2000 Minemoto ................. B41J 2/06
  347/55
2003/0186085 A1* 10/2003 Murata ................ G11B 5/8404
  (Continued)

FOREIGN PATENT DOCUMENTS

JP  1983-18157 A  2/1983
JP  1995-198655 A  8/1995
  (Continued)

OTHER PUBLICATIONS

[Non-patent Document 1] Isao Tari, "Measurements of Electrokinetic Potential in Non-aqueous Media", Shikizai, 43, 1970, p. 510-517.
  (Continued)

*Primary Examiner* — Christopher P McAndrew
(74) *Attorney, Agent, or Firm* — Ogilvie Law Firm

(57) ABSTRACT

A method and a device are provided for measuring a zeta potential with reproducibility, high reliability and high accuracy, by predicting an equilibrium value from the change over time of a streaming potential. In measurement of the zeta potential of a sample surface using a streaming potential method, an external pressure is changed in a step-wise manner, and a pressure change profile is set having a rising part or a falling part which is of a shorter time than the relaxation time T required for response to a change in the streaming potential accompanying the change in external pressure, and a steady part in which pressure is held at a steady state for a time longer than the relaxation time T. An asymptotic value of the streaming potential extrapolated from the transient response of the streaming potential occurring from the pressure change profile is used to calculate the zeta potential.

20 Claims, 10 Drawing Sheets

(58) Field of Classification Search
USPC .......................................................... 324/452
See application file for complete search history.

(56) References Cited

U.S. PATENT DOCUMENTS

| | | | |
|---|---|---|---|
| 2014/0302589 A1* | 10/2014 | Seefeldt | C12N 9/506 |
| | | | 435/219 |
| 2015/0330925 A1 | 11/2015 | Luxbacher | |
| 2018/0028693 A1* | 2/2018 | Lakshmanan | A61K 49/223 |

FOREIGN PATENT DOCUMENTS

| | | |
|---|---|---|
| JP | 1995-286984 A | 10/1995 |
| JP | 1996-101158 A | 4/1996 |
| JP | 1996-128984 A | 5/1996 |
| JP | 1996-136493 A | 5/1996 |
| JP | 1997-68514 A | 3/1997 |
| JP | 1997-257739 A | 10/1997 |
| JP | 1998-38835 A | 2/1998 |
| JP | 2000-19144 A | 1/2000 |
| WO | 88/03265 A1 | 5/1988 |

OTHER PUBLICATIONS

[Non-patent Document 2] R. A. Gortner, "Electrokinetics XXIII. Electrokinetics as a Tool for the Study of the Molecular Structure of Organic Compounds", Trans. Farad. Soc., 35 (1940) p. 63-68.
[Non-patent Document 3] Fumio Kitahara et al., "Comparison of electrokinetic measurement methods for non-aqueous suspensions—barium sulfate", Kogyo Kagaku Zasshi, vol. 70, No. 12, 1967, p. 2222-2225.
International Search Report, PCT/JP2022/010701, May 31, 2022, 3 pages.

* cited by examiner

Maxwell model    Voigt model

ZETA POTENTIAL MEASUREMENT METHOD AND MEASUREMENT DEVICE

RELATED APPLICATIONS

The present application claims priority to PCT application no. PCT/JP2022/010701 filed 10 Mar. 2022, and to Japanese application no. JP 2021-040878 filed 13 Mar. 2021, each of which is hereby incorporated by reference in its entirety.

TECHNICAL FIELD

The present invention relates to a method for measuring the zeta potential of a solid surface in contact with a medium, and a device for performing that measurement.

BACKGROUND ART

When a solid surface comes into contact with liquids in which water and various organic solvents are used as media and various salts are dissolved as ionic dissociation substances, ionic species are adsorbed on the solid surface, thereby generating a surface potential. An electric double-layer model can be used to represent the state of distribution of ion species at this time. The structure of the electric double-layer model is well known as the Stern model, which consists of a fixed layer in which adsorbed ions are in contact with a solid surface and a diffusion layer located outside the fixed layer. The surface potential generated at the solid-liquid interface is measured as the zeta potential on the slip plane slightly outside the Stern plane present at the interface between the fixed and diffusion layers. Because the zeta potential changes sensitively, reflecting the physical and chemical properties of various solid surfaces, it plays a very useful role in analyzing the physical and chemical properties of solid surfaces. Especially, it has been used as an index for evaluating colloidal dispersibility/aggregation, interactions, and surface modification.

Electrophoresis and the like are mainly used to measure the zeta potential of the surfaces of dispersed particles such as colloids that exist in a relatively stably dispersed state in a liquid. However, when zeta potential measurement by electrophoresis cannot be used, such as in dense systems, coarse particles, fibrous substances, or flat samples, the streaming potential method and electroosmotic flow method are used.

Both were used to observe the same phenomenon physically. However, in the electroosmotic flow method, since the flow of the sample solution generated by the voltage applied to the electrodes at both ends of the cell is measured, and the osmotic flow rate varies depending on the distance from the upper and lower surfaces inside the cell, it is necessary to add monitor particles and measure the relationship between the distance from the cell surface and the migration speed of the particles. Therefore, the measurement is complicated and the measurement accuracy may not always be sufficient.

In contrast, the streaming potential method determines the zeta potential of a solid sample inside a cell by measuring the potential or current generated when a pressure difference is applied across the cell. Similarly, it can be used for various purposes to measure the zeta potential of solid surfaces of various shapes, similar to the electroosmotic flow method. As for the parameters to be determined by the streaming potential method, it measures the potential difference or current value generated by the applied pressure and these values can be determined precisely with relative ease. Non-Patent Document 1 describes various zeta potential measurement methods, the relationship between the measurement results obtained, and the properties of the solid-liquid interface.

Conventionally, the properties of the solid-liquid interface of various materials have been evaluated and studied based on knowledge obtained from zeta potential measurements, mainly in aqueous media. Recently, the need for zeta potential measurement in non-aqueous media has increased in various fields. For example, the use of zeta potential is expected in the evaluation of the dispersibility of fibrous materials, such as carbon nanotubes in organic solvents, impregnation evaluation of electrolyte solutions in battery manufacturing, and the relationship between ion transport and electrode reactions. Similarly, to evaluate the stability and properties of various electrode surfaces in an electrolyte solution, there is an increasing need to measure the zeta potential of the electrode surface in the electrolyte.

Various surface analysis techniques have been used to analyze solid surfaces. However, for a real system, by measuring the zeta potential at the solid-liquid interface in situ on the surface of a solid placed in a medium, it is required to understand the dynamic state of the electric double layer. For this purpose, zeta potential measurements in various solid surface media are expected to lead directly to extremely useful analyses.

On the other hand, the Helmholtz-Smoluchowski equation, which is described later, is widely used to calculate the zeta potential, and the accuracy of the determined value depends on the viscosity, electroconductivity, and dielectric constant of the medium. In most existing streaming potential measurement devices, including commercially available streaming potential measurement devices, the solvent to be used is limited to water. In most cases, the device configuration is optimized under these conditions. Not only are the physical properties of non-aqueous solvents over a wide range of these parameters, but mixed solvents with water are also often used; therefore, it is difficult to design a device capable of coping with a wide range of these parameters. In addition, because the materials used in cells and fluid flow areas are optimized for aqueous media, it is difficult to limit the measurement methods and numerical analyses that depend on these materials. Therefore, some suitable generalized analytical methods have been sought.

The above-described zeta potential measurements have been carried out mainly on solid-liquid interfaces in water; however, there are various problems with zeta potential measurements, not only in aqueous systems but also in non-aqueous media, which have hindered the analysis of the electrical and electrochemical behaviors of highly concentrated colloidal dispersions and porous materials used in many applications. Among them, especially in the zeta potential measurement method using the streaming potential method, pressure is applied to the fluid in the cell, and the generated streaming potential is measured. It was difficult to obtain reproducible and reliable values because a steady potential value cannot be obtained owing to variations in time and hysteresis effects.

Also, in Non-Patent Document 2, R. A. Gortner, who contributed to the development of the streaming potential measurement method, reported zeta potential measurement results of cellulose membranes or aluminum oxide surfaces in various organic solvents. These zeta potential values showed remarkable changes depending on the length of the alkyl chain in various aliphatic alcohols, carboxylic acids, and their esters used as organic solvents. Also, as the zeta potential values of benzene analogs depend significantly on the nature of their substituents, it has been shown that the adsorption behavior between organic compound molecules and solid surfaces can be clarified by performing zeta potential measurements.

The conventional theory of the electric double layer is based on the static distributions of ions placed in a thermodynamically steady state. The zeta potential has also been measured and interpreted without considering the dynamic change of the solid-liquid interface in the fluid.

However, the properties of the solid-liquid interface change dynamically due to external electric field fluctuations and changes in shear stress, and a transient state exists before reaching a steady state. In the electric double layer model, a fixed layer formed by the adsorption of adsorbed molecules or ions on the solid phase surface and an external diffusion layer are assumed. However, the state of the distribution of ion species existing at and near these interfaces is sensitive to changes in external pressure, potential, and the like. Conversely, it is thought that it will be possible to examine the characteristics of the solid-liquid interface in detail by analyzing the state of such changes. For example, when there is an interaction between ions in the electrolytic solution and various alcohol/ester solvent molecules with high dielectric constant in liquid due to the long-range interaction between dipoles, higher-order structures are thought to be formed due to hydrogen bonds, dipole interactions, and ion-dipole interactions. However, if the high-order structure is distorted due to fluctuations in the pressure applied to the medium, electrostatic relaxation may occur with a relatively long relaxation time due to this distortion. Furthermore, in the absence of specific adsorption of ions, the state of adsorption of ions to the solid surface is affected by external pressure fluctuations, etc., and cases where re-equilibrium adsorption of ions occurs over a relatively long period of time are also conceivable. Alternatively, when the impregnation of the electrolytic solution in the porous material and the restructuring of the flow path in the pores due to the movement of the flowing liquid occur, since the ions in the diffuse double layer in the surface layer are exhibiting viscoelastic behavior due to interactions with solids in solution and changes in the thickness of the diffuse layer that contribute to the electrical double layer, it is conceivable that the resulting zeta potential is influenced by the dynamic relaxation phenomenon of ions in the viscoelastic medium. In addition, the properties of the electric double layer change sharply in response to changes in the external pressure and potential owing to various factors. For example, in the measurement of the streaming potential, it has been clarified by the inventors of the present application that the streaming potential does not immediately reach an equilibrium state, but exhibits a transient behavior in which a steady-state value is reached with a relaxation time during that equilibrium reaching time. Streaming potential measurement is expected to provide an extremely advantageous analytical technique for basic research on the various relaxation processes of such electric double layers.

In conventional zeta potential measurement methods, there was no measurement method that considers the transient phenomenon (relaxation process) of the diffusion double layer as described above. Therefore, the measurement results obtained by conventionally used zeta potential measurement methods were affected by hysteresis, and there is a problem in reproducibility, and an accurate zeta potential value cannot be obtained. Also, since the analysis results based on the values obtained therefrom are also doubtful, there is a problem that caused significant obstacles in the evaluation of the electrode materials and the improvement research based on them.

Non-Patent Document 3 discloses a method of continuously changing the pressure and acquiring a response potential when measuring the zeta potential of a solid-liquid interface using the streaming potential method. However, because the streaming potential is measured while the pressure continuously rises or falls, the streaming potential does not immediately follow the change in pressure; therefore, it is strongly affected by the hysteresis of the pressure change. Therefore, there is a problem that the meaning of the obtained apparent zeta potential value is unclear.

Also, in Patent Document 1, the zeta potential is calculated using the following equation from the rate of change of streaming potential with respect to the rate of change of pressure by continuously changing pressure in the same manner.

[Equation 1]

$$\zeta = \frac{dU_{str}}{d\Delta p} \times \frac{\eta}{\varepsilon_{rel} \times \varepsilon_0} \times \frac{L}{A} \times \frac{1}{R}$$

In the above equation, $U_{str}$ represents the measured value of the streaming potential when the pressure is continuously changed and Op represents the change in pressure. $\varepsilon_{rel}$ and $\varepsilon_0$ represent the relative permittivity and vacuum permittivity, respectively. L represents the length of the cell and A is the cross-sectional area of the cell. R represents fluid resistance.

In this case as well, if the streaming potential cannot instantaneously follow the pressure change rate, the linear relationship between the pressure change rate and streaming potential cannot be established based on the above equation, and the zeta potential values are unreliable and have problems.

PRIOR ART

Patent Document

[Patent Document 1] US 2015/0330925 A1

Non-Patent Document

[Non-patent Document 1] Isao Tari, "Measurements of Electrokinetic Potential in Non-aqueous Media", Shikizai, 43, 1970, p510-517.

[Non-patent Document 2] R. A. Gortner, "Electrokinetics XXIII. Electrokinetics as a Tool for the Study of the Molecular Structure of Organic Compounds", Trans. Farad. Soc., 35 (1940) p63-68.

[Non-patent Document 3] Fumio Kitahara et al., "Comparison of electrokinetic measurement methods for non-aqueous suspensions-barium sulfate", Kogyo Kagaku Zasshi, Vol. 70, No. 12, 1967, p2222-2225.

[Outline of the Invention]

Problems to be Solved by the Invention

As described above, conventionally, in the zeta potential measurement method using the streaming potential method, when applying pressure to the fluid in the cell and measuring the generated streaming potential, the value of the obtained streaming potential fluctuates with time and hysteresis, and it is a problem that reproducible and highly reliable measurement results cannot be obtained.

In view of this situation, the present invention aims to provide a reproducible, highly reliable, and highly accurate zeta potential measurement method and measurement device by predicting an equilibrium value from changes in streaming potential over time.

[Means to Solve the Objects]

In order to solve the above problems, a zeta potential measurement method of the present invention is a method for measuring the zeta potential of a sample surface using the streaming potential method, in which an external pressure is changed in a step-wise manner along a pressure change profile that has a rising part or falling part which is of a shorter time than a relaxation time T required for a response for change in the streaming potential accompanying the change in external pressure, and a steady part in which pressure is held at a steady state for a time longer than the relaxation time T. Then, the zeta potential is calculated using an asymptotic value of the streaming potential extrapolated from a transient response of the streaming potential occurring from the pressure change profile.

A feature of the present invention is the artificial creation of transient streaming potential changes. By applying stepped pressure, various problems such as hysteresis, reliability of measured values, and reproducibility can be solved. Also, it is possible to analyze the electric double layer reflecting electrostatic interaction near a solid-liquid interface and the transient behavior of mass transfer reflecting viscoelastic and transport properties.

It should be noted that a process (step) of the zeta potential measurement method in the present invention can be executed by a computer using a program.

In addition, a zeta potential measurement device of the present invention is a device for measuring the zeta potential of a sample surface using the streaming potential method, in which the device has a pressure adjustment unit by which an external pressure is changed in a step-wise manner, along a pressure change profile that has a rising part or falling part which is of a shorter time than a relaxation time T required for a response for change in the streaming potential accompanying the change in external pressure, and a steady part in which pressure is held at a steady state for a time longer than the relaxation time T. The device also has a zeta potential calculation unit for calculating the zeta potential using an asymptotic value of the streaming potential extrapolated from a transient response of the streaming potential occurring from the pressure change profile.

In a zeta potential measurement method and a zeta potential measurement device of the present invention, the pressure change profile may have at least two steps of $0<t_1<\tau$ and $\tau<t_2<10\tau$ with respect to the relaxation time $\tau$. Here, the time of the rising part or the falling part is $t_1$, and the time of holding the steady part is $t_2$. Also, a fluctuation width of the pressure in the steady part may be suppressed within a range of ±5% with respect to the central value. Furthermore, a transient response of the streaming potential may be approximated by the least-squares method using an exponential function and the zeta potential may be calculated using the estimated value of the streaming potential at infinite time.

[Effects of the Invention]

According to the present invention, the zeta potential measurement method using a streaming potential method is effective in being able to acquire the measurement result and is quick, simple, reproducible, and highly reliable.

MODE FOR CARRYING OUT THE INVENTION

Examples of the present invention will be described in detail below with reference to the drawings. The scope of the present invention is not limited to the following examples and examples shown in the figures, and many modifications and variations are possible.

A feature of the present invention is that, in streaming potential measurement, the pressure applied to the sample liquid introduced into the cell is changed step-wise, and the pressure is maintained in a steady state for a certain period of time. The change in the streaming potential that occurs in that case causes a characteristic behavior that converges to a steady-state value with a relaxation time specific to the measurement sample, so that analysis is performed using exponential function approximation to the measured value of the flowing potential. This method is characterized by being able to provide a reproducible, highly reliable, and highly accurate method for measuring zeta potential.

Here, the relaxation time, as generally defined, is the value obtained by dividing the difference between the physical property value in the equilibrium state and the physical property value at an arbitrary point before reaching the equilibrium state by the rate of change over time for any physical property value that transitions from a non-equilibrium state to an equilibrium state. In the present invention, the rate of change of the streaming potential with respect to time is regarded as a relaxation process, and as shown in the examples described later, the rate of change of the streaming potential with respect to time is proportional to the difference from equilibrium, and it was clarified that the relaxation time with respect to changes in the measured streaming potential showed a constant value. In this case, the difference in the streaming potential from the equilibrium value at any time varies exponentially, and the relaxation time $\tau$ is defined as the time required for the difference in the streaming potential from the equilibrium value to be reduced by ratio of 1/e (that is, approximately 37%).

Figure 1:
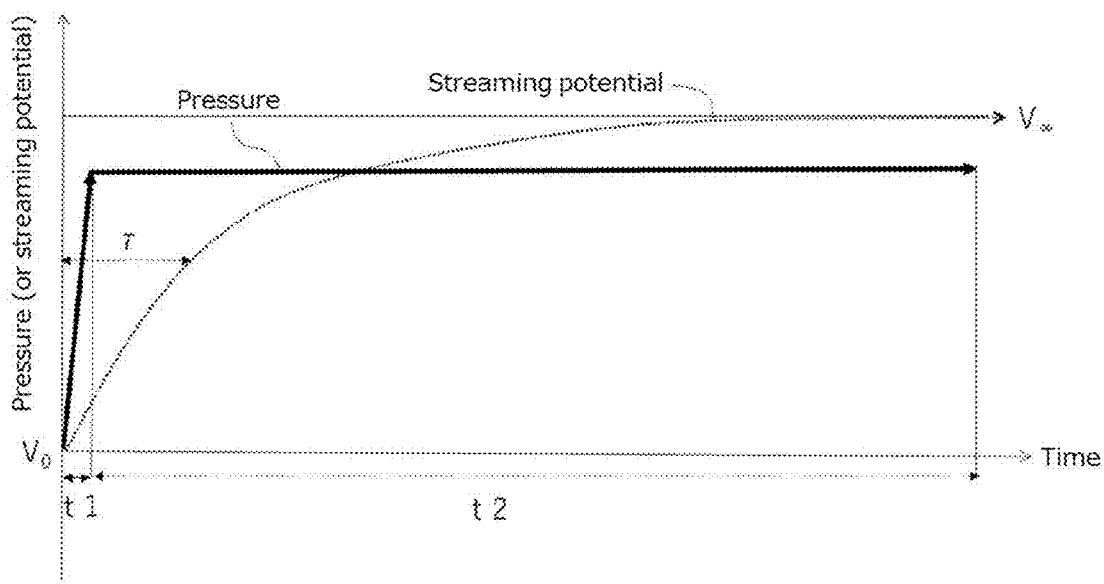
FIG. 1 shows a step-wise pressure change profile applied to a fluid for measuring streaming potential, showing the relationship between the relaxation time $\tau$ of streaming potential due to application of pressure, rising time $t_1$ and holding time $t_2$ of pressurized pressure.

FIG. 1 shows a step-wise pressure change profile applied to a fluid for measuring the streaming potential, along with the relationship between the relaxation time $\tau$ of the streaming potential owing to the application of pressure, rising time $t_1$ of the applied pressure, and holding time $t_2$.

Figure 2:
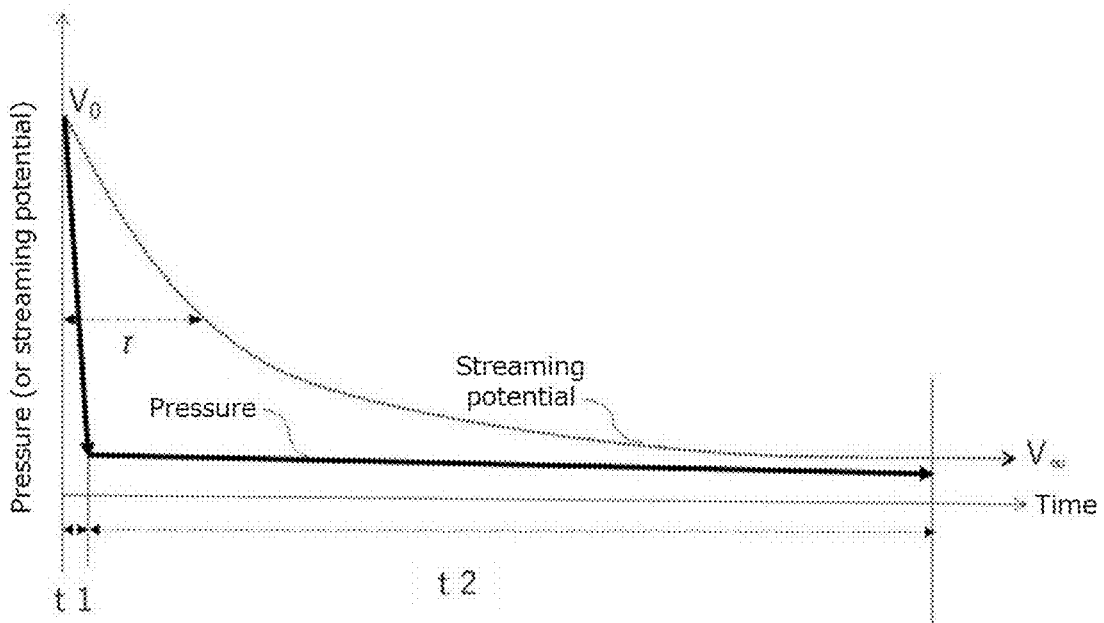
FIG. 2 shows a step-wise pressure change profile for decompressing a fluid for streaming potential measurement in a pressurized state, showing the relaxation time $\tau$ of the streaming potential due to pressure decompression, falling time $t_1$ of decompressed pressure, and holding time $t_2$.

FIG. 2 shows a step-wise pressure change profile for decompressing a fluid for measuring the streaming potential in a pressurized state, along with the relationship between the relaxation time $\tau$ of the streaming potential owing to pressure decompression, falling time $t_1$ of the decompression pressure, and holding time $t_2$.

In any of the above cases, it is preferable that $t_1$ is shorter than the relaxation time $\tau$, and $t_2$ is longer than $\tau$. If $t_1$ exceeds $\tau$, the measured streaming potential may not converge to a steady state value. If $t_2$ is equal to or shorter than $\tau$, then similar steady-state streaming potential values may not be observed. Although it is possible to set any time exceeding T to $t_2$, it is preferable to shorten the time required for the measurement as much as possible. For this purpose, the upper limit of $t_2$ is preferably less than $10\tau$, which is ten times $\tau$, and may be less than $5\tau$ or less, in a more preferable aspect.

As will be shown in the examples described later, in the streaming potential measurement according to the present invention, the relaxation time that reaches approximately 37% of the difference between the initial and equilibrium values of the streaming potential is on the order of several seconds to several minutes or longer. However, because the time required to reach the set pressure by opening the pressure valve to pressurize the fluid in the cell was less than a second, the condition $\tau \gg t_1$ was maintained.

In the present invention, it is preferable to perform streaming potential measurements by providing two or more pressure change steps, as shown in FIG. 1 and FIG. 2. Using the streaming potential values measured in multiple steps, the zeta potential of the sample surface can be obtained from the streaming potential values for each pressure in the Helmholtz-Smoluchowski equation, which will be described later.

Figure 3:
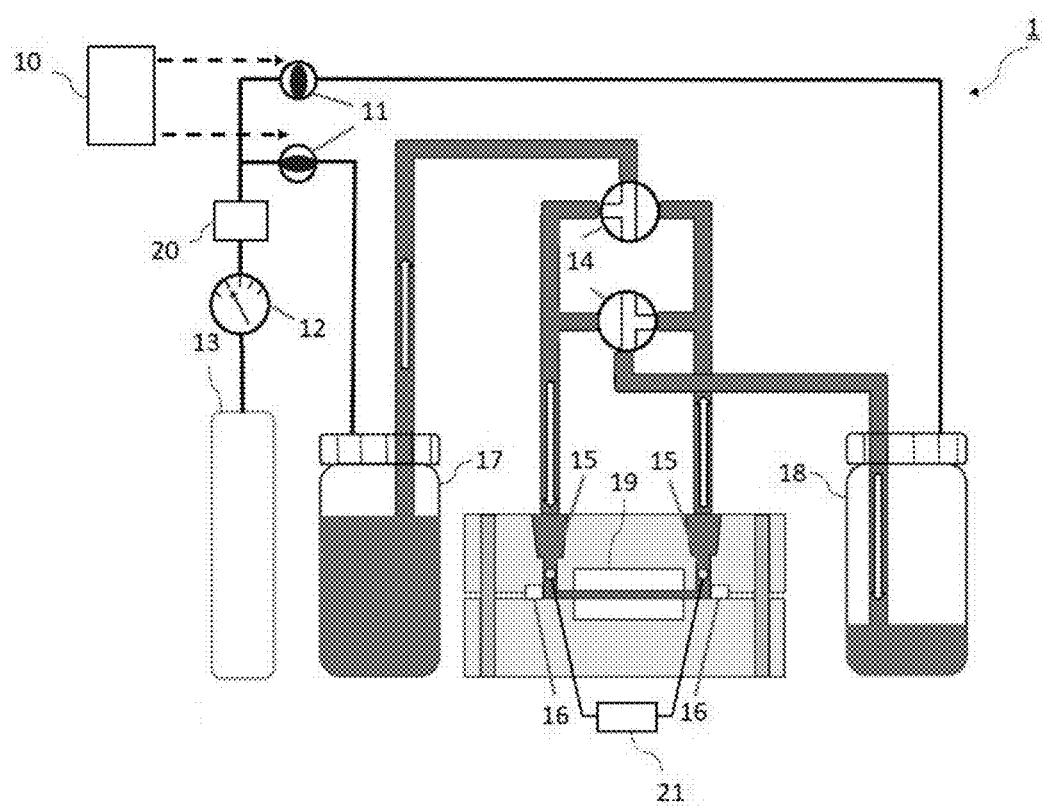
FIG. 3 shows a schematic diagram of the streaming potential measurement device.

An example of a schematic diagram of a measurement device that can be used to carry out the present invention is shown in FIG. 3.

In the present invention, the pressure is changed stepwise. Unlike conventional manners, continuous pressure changes owing to piston movement within the syringe are not provided. For example, it is preferable to adjust the pressure by adding the pressure of pressurized gas to the liquid used for measurement. Therefore, in the present invention, it is preferable to provide a pressure adjustment mechanism for digitally and instantaneously adjusting the gas pressure in this case. The rate of change in pressure is adjusted to a time shorter than the relaxation time $\tau$ of the streaming potential, which will be described later. Alternatively, the liquid can be sent while being pressurized using various liquid-sending pumps.

In order to minimize delays in response speed due to friction and weight, it is preferable that the pressure adjustment valve be a mechanism that operates instantly with an electrical signal such as a solenoid valve.

Arbitrarily adjusting the flow velocity of the liquid sent by pressurization is performed. However, at this time, it is possible to set the flow of the fluid inside the cell to either laminar flow or turbulent flow by adjusting the amount of liquid supplied per unit time to the volume inside the cell. In the present invention, cells having various shapes such as cylindrical tubes, right-angled tubes, and flat plates can be used according to the shape of the sample to be measured. Regarding the material of the cell, it is possible to use various plastics, ceramics, and metals. However, in order to avoid charging of the surface, the cell may be constructed using a substrate having a physicochemical inert and stable surface as much as possible.

It is also preferable to construct a cell for measuring streaming potential according to the present invention by using an organic polymer material instead of an inorganic material that is generally used in an aqueous solution system. As the organic polymer material that can be used in this case, cells made of various resin materials such as acrylic resins, styrene resins, polyester resins, polycarbonate resins, polyurea resins, polyether resins, polyethylene resins, and polypropylene resins are also preferably used. More preferably, in order to confirm the state inside the cell, it is preferable to have translucency, chemical resistance to various acids and alkalis, and good solvent resistance to various organic solvents. Preferred resins that can be used for such purposes include polypropylene-based resins. However, since the solubility in each solvent should be appropriately selected, the propriety of the material should be determined based on its solubility in the solvent, and the material is not limited by this case.

One of the features of the present invention is that the pressure is held at an arbitrarily set value for a certain period of time. In this case, in order to keep the pressure steady, the purpose is achieved by constantly adding the above gas pressure to the liquid. It is preferable to suppress pressure fluctuations within ±5%, preferably within 1%, and more preferably within ±0.1% using a pressure regulator or the like. When using a method in which the liquid used for measurement is sent by various fluid pumps, pulsating flow is prevented, and the range of pressure fluctuation in the steady part is maintained within a range of ±5% with respect to the central value. Therefore, a more accurate streaming potential value is obtained. If the pressure fluctuation exceeds ±5% during the measurement, the measured value of the streaming potential may not be stable and an accurate value may not be obtained. Furthermore, taking into consideration the fact that the measurement is performed with consideration given to the transient response for the accuracy requirement in the calculation of the zeta potential in the processing flow described in the next section, the pressure is also required to have the same accuracy. Therefore, in order to maintain the range of ±0.1% with respect to the central value, it is desirable to use a pressure regulator that can avoid the influence of pressure loss on the upstream side of the cell and that measures the pressure part of the fluid or the inside of the fluid.

Figure 4:
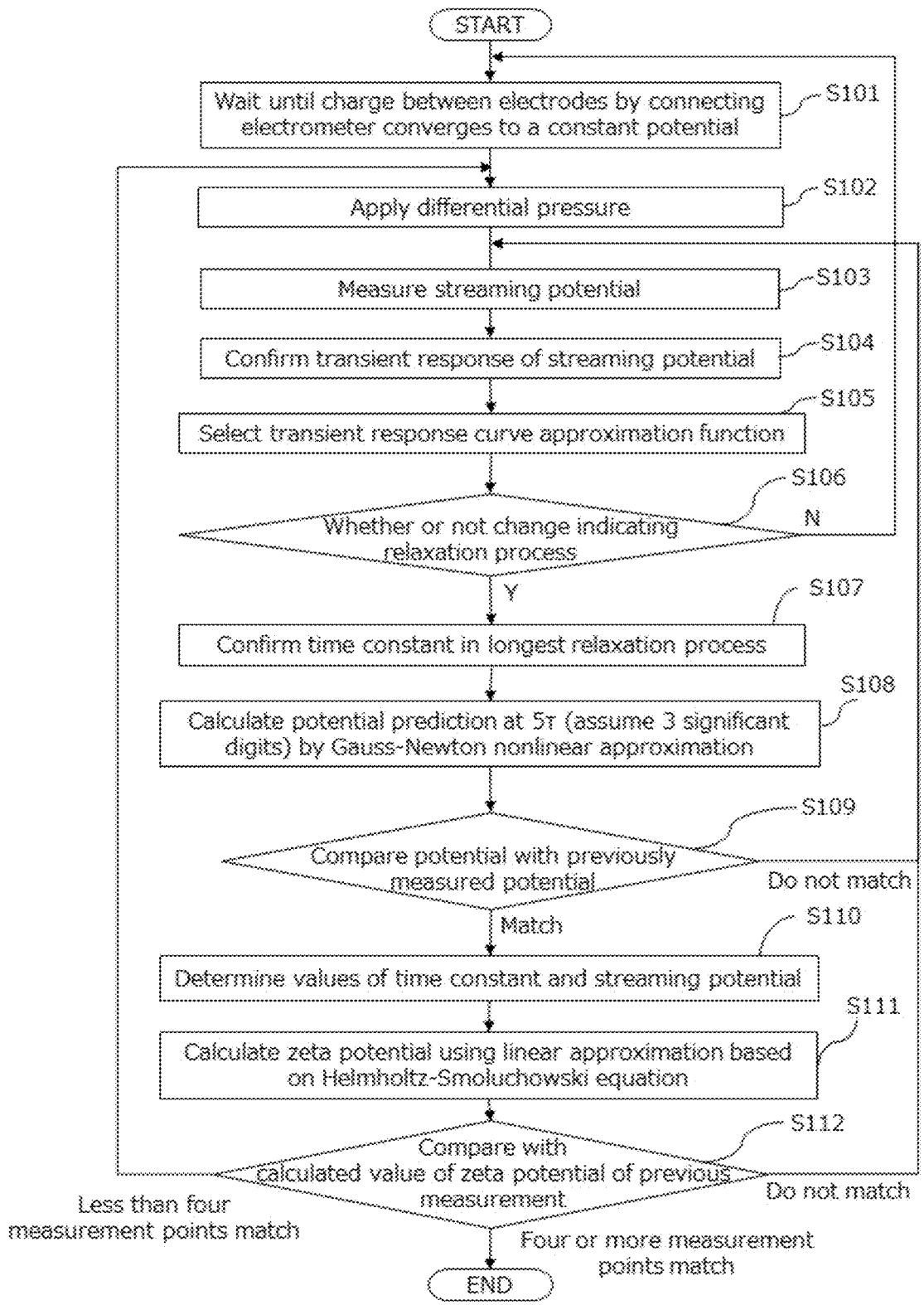
FIG. 4 shows a processing flow diagram for streaming potential measurement of the present invention.

FIG. 4 shows the processing flow from the start of the measurement to the determination of the zeta potential in a measurement method for carrying out the present invention.

Wait until the charge between the electrodes by connecting the electrometer converges to a constant potential (step S101), apply a differential pressure (step S102), measure the streaming potential (step S103), and confirm the transient response of the streaming potential (step S104). Select a transient response curve approximation function (step S105). Determine whether or not there is a change indicating the relaxation process of the streaming potential (step S106), and confirm the time constant in the longest relaxation process if there is a change indicating the relaxation process (step S107). Calculate an estimated streaming potential using Gauss-Newton nonlinear approximation (step S108). At this time, it is preferable to estimate the time five times as long as the relaxation time $\tau$ and to calculate with the value of 3 digits of assumed significant digits. Compare the potential with the previously measured potential (step S109), and determine the values of the time constant and the streaming potential if it is determined that they match (step S110). Then, calculate the zeta potential using linear approximation based on the Helmholtz-Smoluchowski equation (step S111). Compare with the calculated value of the zeta potential of the previous measurement to improve the measurement accuracy (step S112). As a result, if four or more measurement points match, the measured value of the zeta potential is determined and the measurement is completed. In addition, it is preferable that six or more measurement points match each other. As a result of comparison with the calculated value of the zeta potential of the previous measurement, if less than four measurement points match, the process returns to the step before differential pressure application (step S102). Also, as a result of comparison with the calculated value of the zeta potential of the previous measurement, if they do not match, the process returns to before the measurement of the streaming potential (step S103).

Details of the measurement method for carrying out the present invention will be described in detail using the following examples, but the present invention is not limited to the components shown in the following examples.

Example 1

<Example of Zeta Potential Measurement of Lithium Cobalt Oxide Membrane Surface in Water (pH=5.86)>

A dispersion of lithium cobalt oxide ($LiCoO_2$) in NMP (N-methylpyrrolidone) was prepared using polyvinylidene fluoride as a binder, which was coated on the surface of the support and dried to produce a $LiCoO_2$ membrane. The cells were made of polypropylene sheets, mm long and 10 mm wide, facing each other in parallel with a gap between them. The $LiCoO_2$ membranes were attached to the upper and lower surfaces inside the cell, and the distance between the membranes was adjusted to 50 μm. An aqueous solution of lithium perchlorate dissolved at a concentration of 10 mmol/L was used as the electrolyte solution. The pH of the aqueous solution was adjusted to 5.86.

A schematic diagram of the measurement device is shown in FIG. 3.

In FIG. 3, the aqueous solution fed into reservoir 17 is pushed up into the flow channel by gas pressure from a dry nitrogen gas cylinder 13 equipped with a pressure gauge 12 and pressure reducing valve 11, and is introduced into cell 19 by a three-way cock 14. The aqueous solution that passed through cell 19 was pumped into the collection vessel through a three-way cock 14. The velocity of the aqueous solution in cell 19 varied with the gas pressure. The applied pressure is a parameter for changing the output voltage and affects its accuracy. Therefore, the pressure was adjusted to 0.1 MPa by a pressure regulator connected to the upstream gas cylinder 13, and a pressure regulator (Cofloc pressure regulator 6600A) with reproducibility within ±1%, regardless of the upstream pressure fluctuation, was used to suppress pressure fluctuations to ±0.1% or less. Measurements in non-aqueous media, as described below, were performed in the same manner.

Figure 5:
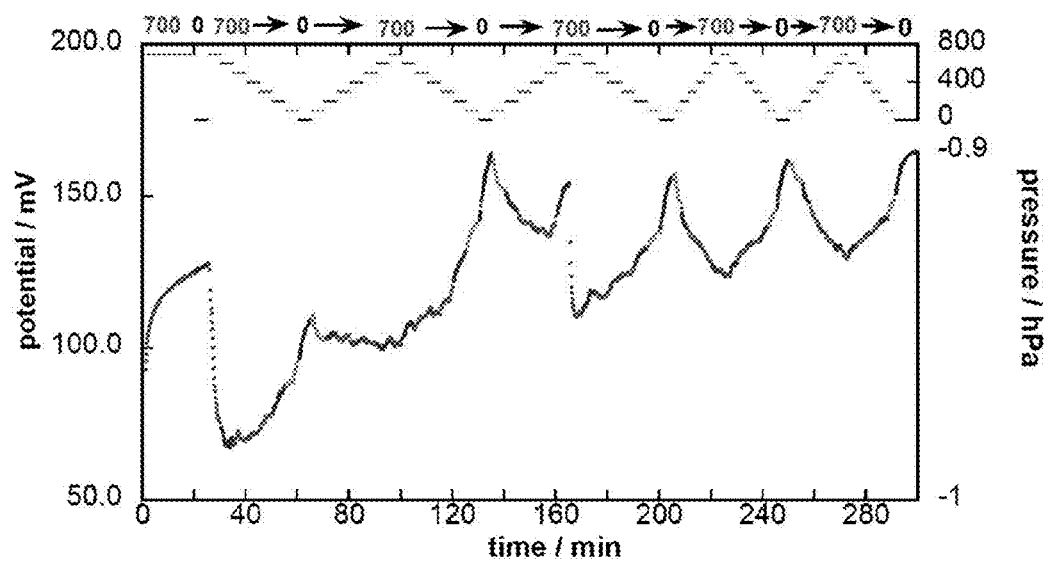
FIG. 5 shows a graph showing the process of pressurization and depressurization from the start of the experiment in Example 1, and the transition of the streaming potential.

In this example, the valve of the dry nitrogen gas cylinder 13 was first opened to apply pressure to the aqueous solution in reservoir 17 to increase the pressure on the side flowing into the cell to 700 hPa, and the cock was opened to set the flow rate in the cell at 90 mL/min. Because the cross-sectional area of electrolyte reservoir 17 was 144 $cm^2$, the linear velocity of the gas was only (90/144)×(1713/1013) =1.06 sccm, and there was almost no pressure loss in the flow path of the gas for pressurization. In addition, almost no fluctuation was observed in the pressure monitor (minimum display pressure 1 hPa) connected to the pressure regulator, and the pressure fluctuation during measurement was less than ±0.1%. Platinum wire 15 was installed at both ends of the cell 19, and the potential difference between the two ends was measured using an electrometer 21 (TR8652 from Advantest). The analog data output from electrometer 21 was collected as digital data using a data logger (not shown) with a sampling interval of 5 s. The change in voltage from the start of the measurement is shown in the graph in FIG. 5.

After the start of pressurization, the pressurization was continued for about 30 minutes, and the aqueous solution was continued to flow. Thereafter, the pressure was reduced step-wise. The stair-step pattern shown at the top of the graph in FIG. 5 indicates the pressure change profile applied to the fluid inside the cell. As shown in FIG. 3, the pressure added to the inside of the cell was measured using a pressure sensor 20 installed directly above the upstream side of the cell. The time $t_1$ to reach the set pressure in each step was 1 second or less, and the measured value during measurement time $t_2$ after reaching the set point was maintained within ±0.1% of the set value in all conditions. Starting at 700 hPa, the pressure was reduced at intervals of 100 hPa, and the streaming potential was measured while reducing the pressure step-wise and maintaining the pressure for two and half minutes at each step. After reaching 0 hPa, the pressure was increased, similarly, the pressure was increased step-wise up to 700 hPa with a holding time of 2.5 minutes every 100 hPa.

Furthermore, depressurization and pressurization cycles were repeated several times, such as 700→0→700→0, and the streaming potential was measured each time. The change in the streaming potential observed between 120 and 160 minutes from the start of the measurement was repeated in the subsequent cycles, and no hysteresis was observed after 160 minutes from the start of the experiment. Thus, repeated reproducibility suggests that the condition inside the cell has stabilized since then.

Figure 6:
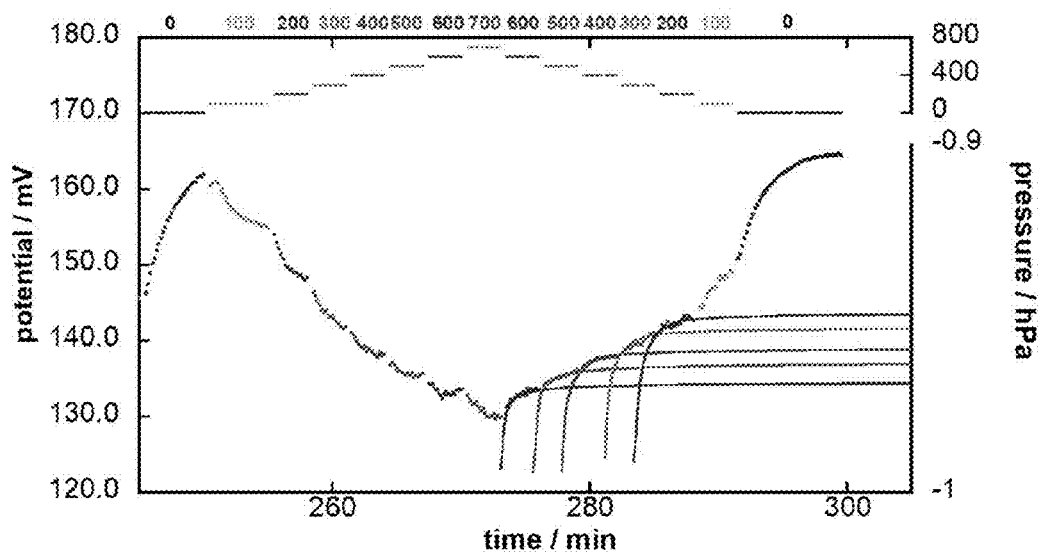
FIG. 6 shows an overlay of a partial enlarged view of FIG. 5 and an approximate exponential curve.

In each pressure-change cycle, the pressure changes (both rising and falling) between each step were completed within a few seconds. FIG. 6 shows the change in the streaming potential due to the pressure reduction step from the point of pressurization to 700 hPa, approximately 275 minutes after the start of the measurement. In FIG. 6, the numerical values of the streaming potential at each pressure step are approximated by an exponential function and illustrated together as an approximate curve.

In the approximate curves showing the change in the streaming potential at each step shown in FIG. 6, the equilibrium value $V_\infty$ was calculated and normalized based on the difference between the initial value $V_0$ and the normalized value $(V(t)-V_\infty)/(V_0-V_\infty)$, which was then approximated by an exponential function $\exp(-t/\tau)$ using the Gauss-Newton approximation method. The logarithm of the measured values and the approximations from the obtained approximation equation were plotted against time, the results of which are shown in FIG. 7.

Figure 7:
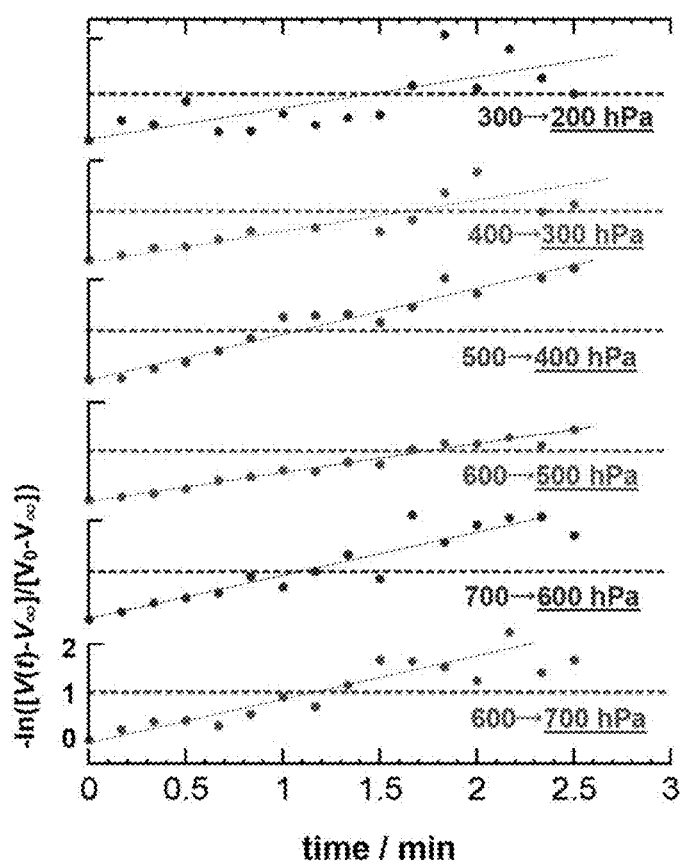
FIG. 7 shows a linear relationship obtained by logarithmically transforming the approximate exponential curve in FIG. 6.

From FIG. 7, it was confirmed that the streaming potential changes measured at each pressure were in good agreement with the formula obtained by the exponential approximation. In this case, the relaxation time $\tau$ was about 70 seconds. Having confirmed the validity of the exponential approximation, the zeta potential $\zeta$ was obtained by linear approximation based on the Helmholtz-Smoluchowski equation in Equation 2 below, using the equilibrium value $V_\infty$ at each pressure, where V is the streaming potential, P is the pressure, $\eta$ is the viscosity of the solution, $\lambda$ is the conductivity of the solution, $\varepsilon$ is the relative permittivity, and $\varepsilon_0$ is the permittivity of a vacuum $(8.854\times10^{-12})$.

[Equation 2]

$$\zeta = \frac{V}{P}\frac{\eta\lambda}{\varepsilon\varepsilon_0}$$

Figure 8:
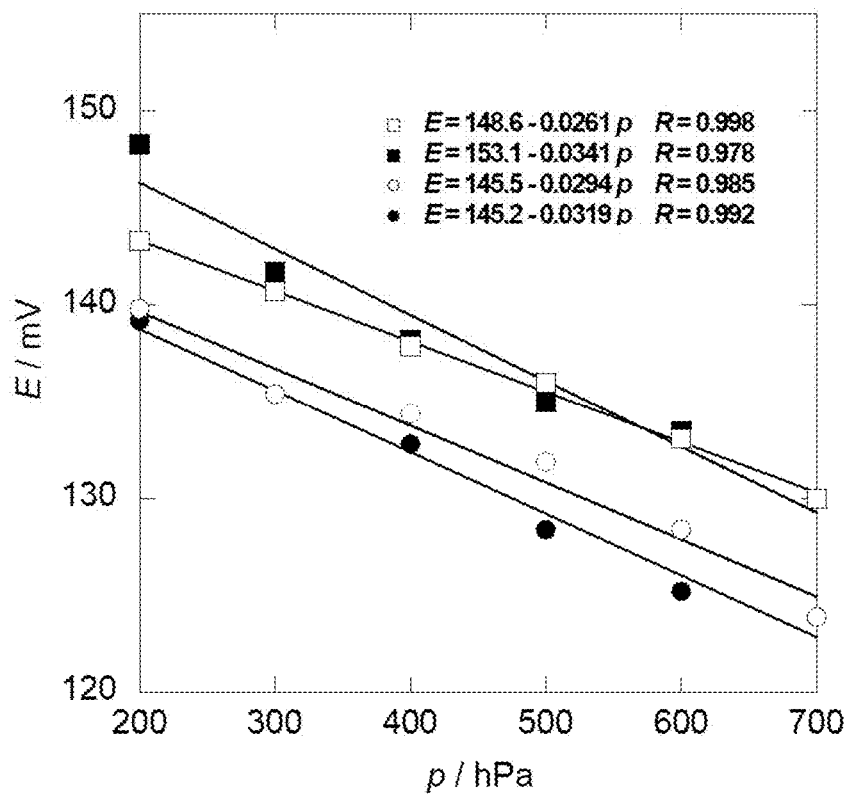
FIG. 8 shows a graph showing the linear relationship between the streaming potential and the steady-state value obtained at each pressure in Example 1 (zeta potential calculated from the slope of the straight line).

FIG. 8 plots the relationship between the pressure and streaming potential for the part where the pressure step of 700 hPa →0 hPa was repeated four times. A good linear relationship was obtained in all cases, and a zeta potential of −20.5 mV was obtained as the zeta potential.

Example 2

<Example of Zeta Potential Measurement of Lithium Cobalt Oxide Membrane Surface in Water (pH=11.41)>

Streaming potential measurements were performed in the same manner as in Example 1, except that lithium hydroxide was added to the lithium perchlorate aqueous solution to adjust its pH to 11.41. As a result, a zeta potential of −45.2 mV was obtained.

Example 3

<Example of Zeta Potential Measurement of Lithium Cobalt Oxide Membrane Surface in Water (pH=2.06)>

Figure 9:
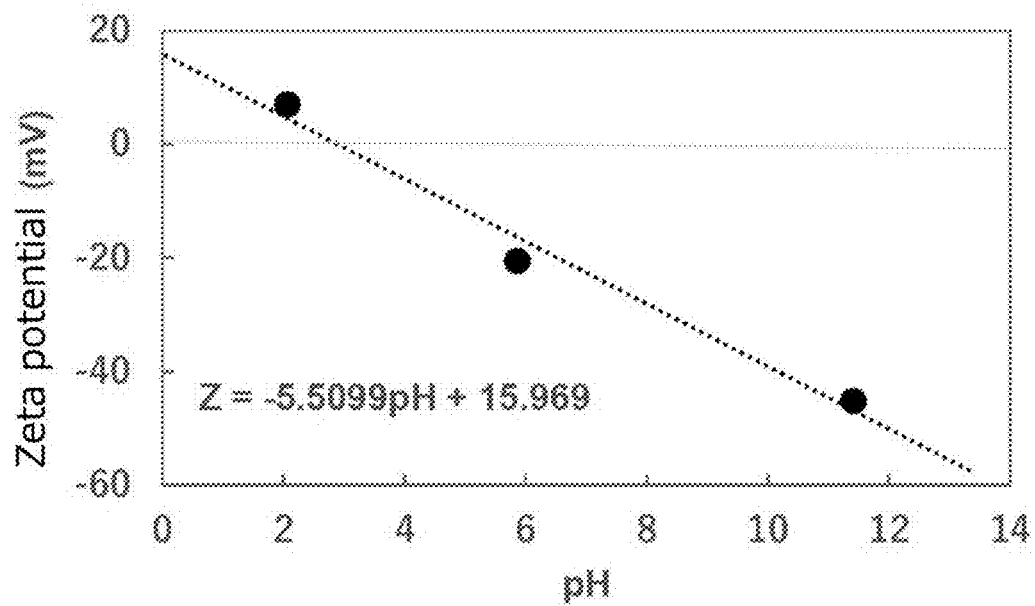
FIG. 9 shows a view showing pH dependence of zeta potential of lithium cobalt oxide membranes obtained in Examples 1 to 3.

Streaming potential measurements were performed in the same manner as in Example 1, except that perchloric acid aqueous solution was added to the lithium perchlorate aqueous solution to adjust the pH of the solution to 2.06. As a result, a zeta potential of 7.1 mV was obtained. The results for Examples 1-3 are summarized in FIG. 9. From this figure, it is clear that the zeta potential value of the $LiCoO_2$ membrane surface in lithium perchlorate solution changes linearly from positive to negative with increasing pH, and clearly shows an isoelectric point at a pH of approximately 3.

Example 4

<Example of Zeta Potential Measurement of Lithium Cobalt Oxide Membrane Surface in Non-Aqueous Medium>

Using the $LiCoO_2$ membrane prepared in Example 1, experiments were conducted by changing the solvent used to dissolve lithium perchlorate from water to propylene carbonate (PC) and setting the concentration of lithium perchlorate to 1.0 mol/L. The PC solution had a conductivity of 611 mS/m, a viscosity of $7.85\times10^{-2}$ Pa/s, and a dielectric constant of 64.92.

Figure 10:
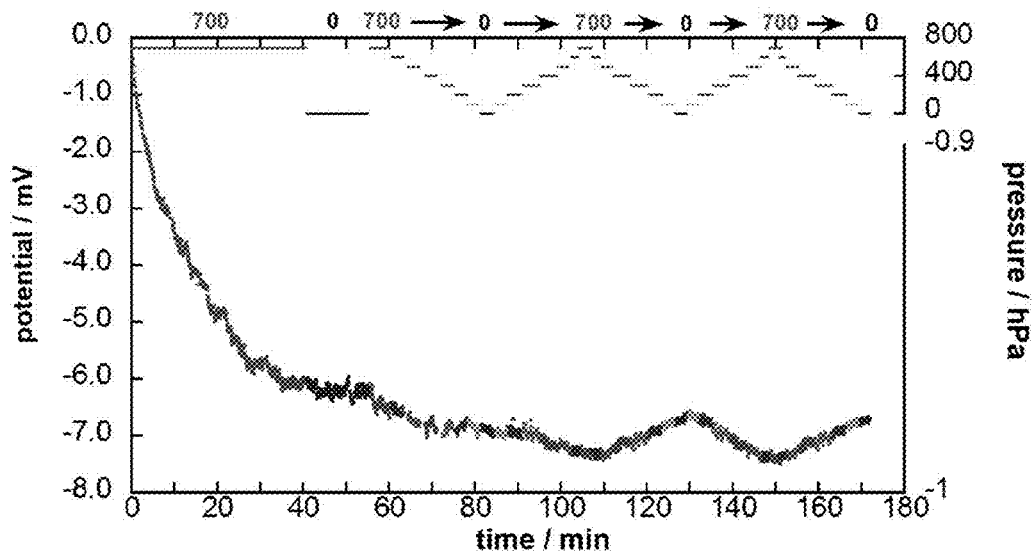
FIG. 10 shows an image view of change in streaming potential in zeta potential measurement of lithium cobalt oxide membrane surface in a non-aqueous medium in Example 4.

The displacement of the output values from the electrometer from the start of the experiment to the measurement of the streaming potential is shown in FIG. 10. When the electrometer was connected to both ends of the platinum wire installed at both ends of the cell while the pressure was pressurized to 700 hPa and the solution was passed through the cell, a gradual variation in the potential occurred over a period of approximately 60 minutes owing to charging between the electrodes caused by the load from the electrometer. After approximately 60 min, the potential stabilized, and from this point onward, the pressure change cycle was repeated in a staircase fashion between 700→0 hPa and 0→700 hPa in 100 hPa steps. The pressure was maintained for approximately 4 minutes at each step. The pressure change between each step was completed within a few seconds. The initial pressure change between 700→0 hPa and 0→700 hPa stabilized the surface condition of the measured sample placed in the cell, and the streaming potential observed during the subsequent pressure change process followed the pressure change, confirming to show a highly reproducible relationship between streaming potential and pressure. In this case, the measurement of the streaming potential to determine the zeta potential began approximately 110 minutes after the start of the experiment.

Figure 11:
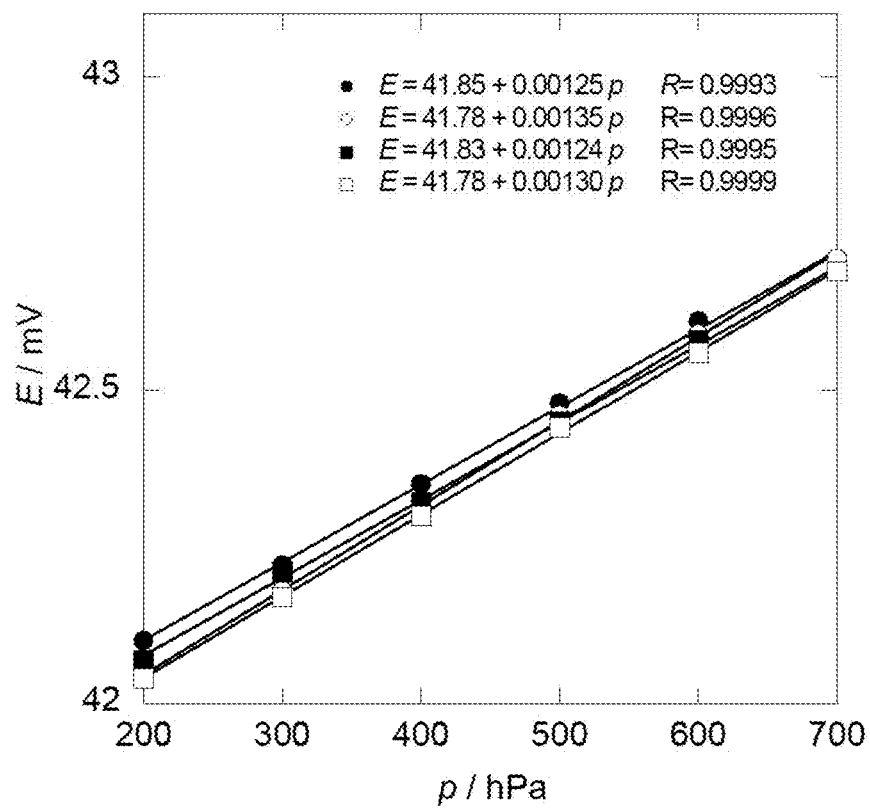
FIG. 11 shows a view showing the relationship between pressure and streaming potential obtained in Example 4.

After repeating the pressure change steps and examining the approximate function of the transient response curve according to the algorithm for the displacement of the streaming potential at each pressure, a first-order exponential function was selected. Because this variation showed a steady exponential change during the measurement, the steady-state value of the streaming potential at each pressure was obtained by the exponential approximation using the Gauss-Newton approximation, as in Example 1. This measurement process was repeated four times, and a plot of the relationship between the steady-state value of the streaming potential and the pressure is shown in FIG. 11.

The results of all four measurements were in good agreement, with an average zeta potential of 108 mV. The relaxation time $\tau$ calculated by the exponential approximation was approximately 6 min. This value is approximately five times longer than the relaxation time of approximately 70 s for the aqueous solution in Example 1.

The characteristics of the measured system and the relaxation phenomenon are crucial in interpreting the results. It was shown earlier that the measured response of the streaming potential to a rapid change in pressure at each pressure can be expressed by the following equation.

[Equation 3]

$$V(t) = V_0 \exp\left(-\frac{t}{\tau}\right) + V_\infty$$

In Equation 3, t represents the time from the start of the measurement, $V_0$ represents the initial value of the streaming potential at the start of the measurement, and $V_\infty$ represents the steady-state value of the streaming potential at time infinity when the pressure is kept constant at each pressure change step.

There are three possible causes of the relaxation phenomenon in the above equation.

The first phenomenon originates from the time constant that comes from the response time of the device system; the second is the macroscopic apparent response when the cell interior is viewed as an RC series electric circuit consisting of a capacitor C and a resistor R; and the third is a relaxation response originating from the adsorption and diffusion of ions on the $LiCoO_2$ membrane surface inside the cell, or a stress relaxation phenomenon arising from the distortion of the electrical double layer.

The first possibility is eliminated because the time constant of the entire system is the sufficiently small since the fluid velocity is below the speed of sound, the pressure change responds in a much shorter time than the measurement time, and the response speed of the electrometer is fast. Next, the transient process when the measurement system was regarded as an RC series circuit was considered by replacing the addition of pressure with the addition of voltage to the RC series circuit. In this case, the relaxation time $\tau$ is expressed by the following equation.

$$\tau = R \times C \quad \text{[Equation 4]}$$

Here, the electrical conductivity of the PC solution of lithium perchlorate (1.0 M) was measured to be 611.4 mS/m. From a cell length of 50 mm=$5\times10^{-2}$ m and a cross-sectional area of 10 mm×0.05 mm=$5\times10^{-7}$ m², and R is calculated as R=$1.636\times10^5$ Ω.

On the other hand, the capacitor capacitance C is calculated to be C=$5.75\times10^{-9}$ F, because the relative permittivity is 64.92, the area of the parallel plate is $5\times10^{-4}$ m², and the distance of the electrode plate is $0.05\times10^{-3}$ m. The relaxation time (time constant) $\tau$ was determined to $9.40\times10^{-4}$ s. Therefore, because the relaxation time caused by the electrochemical nature of the measurement system is estimated to be approximately 1 ms at most, it is difficult to attribute the minute-order relaxation time observed in this example to this cause.

Regarding the third interpretation from the mechanical relaxation phenomenon, the interpretation method related to viscous flow is illustrated because the sample morphology in this example is an opposed thin-film material and the fluid liquid is circulating in the gaps between them.

First, the Reynolds number Re of the fluid flowing in the cell is calculated according to the following equation.

[Equation 5]
$$Re = \frac{\rho U L}{\eta}$$

Here, p is the density of the fluid, U is the representative flow velocity, L is the representative length, and $\eta$ is the viscosity coefficient of the fluid. Assuming that the density of the 1M lithium perchlorate PC solution is $1.31\times10^3$ kg/m³ (from $LiPF_6$ data), the volume inside the cell is $2.5\times10$ m³, and the maximum flow rate is 90 mL/min=$1.5\times10^{-6}$ m³/sec passed through this cell internal volume, the average flow velocity U is U=0.05 m×$1.5\times10^{-6}$ m³/sec/$2.5\times10^{-8}$ m³=3 m/s, the representative length L is $2\times5\times10^{-7}/(10.05\times10^{-3})$ =$10^{-2}$, and furthermore, if the viscosity coefficient is $7.85\times10^{-3}$ Pa·sec, the Reynolds number is estimated to be Re=516. Because this value is sufficiently small compared with 2000-4000, which is the standard for the transition from laminar to turbulent flow, the fluid in the cell in this example is considered to fauna laminar flow. In this case, the flow profile inside the cell was estimated to exhibit a parabolic flow distribution with zero velocity near the wall surface and maximum velocity near the center of the cell cross-section.

The fluid flows into the cell with a maximum pressure of 700 hPa and is pressurized by the nitrogen gas cylinder. If the difference between the inner diameter of the pipe and the inner diameter of the cell is large, a considerably higher pressure is applied to the $LiCoO_2$ membrane on the cell wall surface as normal stress. Therefore, the stress applied to the $LiCoO_2$ membrane surface was considered to be normal stress as well as shear stress. 700 hPa=kg/cm², which means that a fairly large stress of 700 g or more per square centimeter was applied.

Although the fluid is incompressible, it may require a relatively long time for the adsorption and diffusion of ions in a non-aqueous medium with a high dielectric constant, such as the lithium-ion battery exemplified earlier, or in the presence of a dissolved polymer in the medium. Furthermore, in cases where higher-order structures are formed due to dipolar interactions or in the case of polymer solutions, it is known that the viscosity of the solvent increases significantly near the solid phase and that it exhibits relaxation behavior in response to the application of compressive or shear stress.

For example, in the reference "M. Mizukami et al., Hydrogen-Bonded Macrocluster Formation of Ethanol on Silica Surfaces in Cyclohexane, J. Am. Chem.Soc.,124, 12889-12897 (2002)", it was revealed that ethanol molecules selectively adsorb via hydrogen bonding on the silica glass surface in an ethanol/cyclohexane mixed solvent, forming an adsorption layer ranging from several nanometers to several tens of nanometers. It has been shown that in this case, the adsorbed layer faults a cluster structure via hydrogen bonding, and the ethanol molecules are connected to each other by hydrogen bonds, which essentially exist as polymers.

Figure 12:
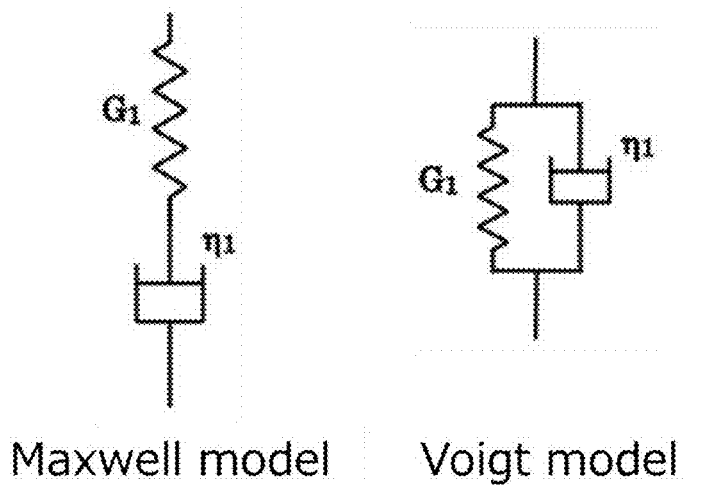
FIG. 12 shows a view showing Maxwell model (left) and Voigt model (right) as viscoelastic models.

The Maxwell and Voigt models shown in FIG. 12 are common models for representing these various relaxation processes; the Maxwell model represents the stress relaxation process, and the Voigt model represents the creep process.

Figure 13:
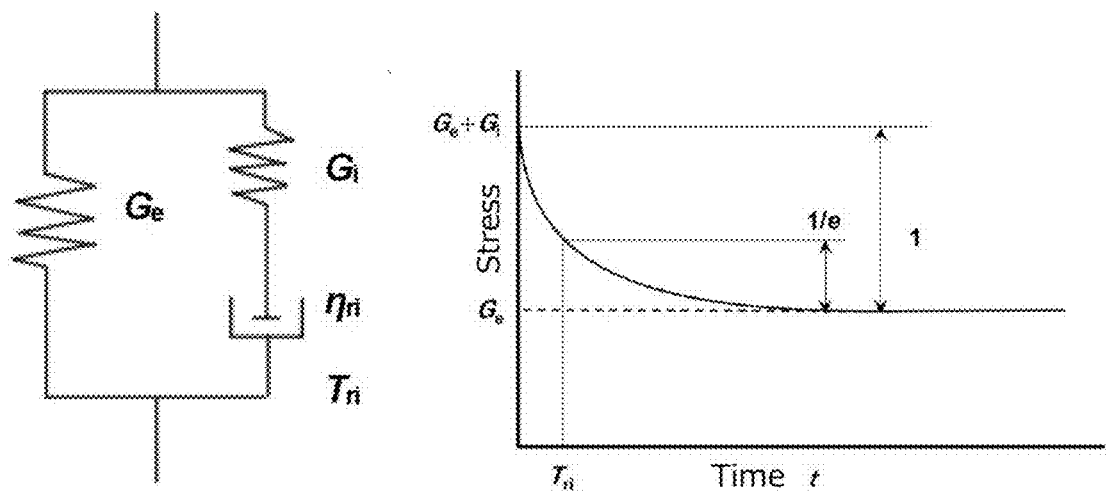
FIG. 13 shows a mechanical equivalent model (left) and relaxation process (right) for expressing the relaxation phenomenon of streaming potential.

The electrical double layer on the $LiCoO_2$ surface reaches equilibrium with time when pressure is applied in a staircase fashion in the streaming potential measurement. For simplicity, the relaxation phenomenon is henceforth explained as stress relaxation when strain is applied to the mechanical equivalent model. The stress relaxation phenomenon at a constant strain is represented using the deformed Maxwell model with parallel combinations of springs, as shown in FIG. 13. In FIG. 13, the left side represents the deformed Maxwell model consisting of springs and dashpots, and the right side illustrates stress relaxation with time.

In FIG. 13, the external force corresponding to the stress is the pressure applied to the fluid in the cell. When the fluid inside the electric double layer is deformed by a sudden pressure change, the spring component, represented by Ge and Gi in the figure, is initially stretched by the strain ε, and the stress increases by an amount equivalent to (Ge+Gi). The dashpot component gradually relaxes as it expands, and stress G(t) is expressed by the following equation.

$$G(t) = G_e + G_i \exp(-t/\tau) \quad \text{[Equation 6]}$$

Here, the relaxation time τ is expressed as the following equation.

$$\tau = \eta/G_i \quad \text{[Equation 7]}$$

Here, η is the viscosity and Gi is the elastic modulus of the spring component in series with the dashpot. Because the modulus of elasticity is equivalent to the streaming potential V(t) in the streaming potential measurement, as shown above, the following equation is obtained.

[Equation 8]

$$V(t) = V_0 \exp\left(-\frac{t}{\tau}\right) + V_\infty$$

In this mechanical equivalent model, the relaxation time τ is considered to vary exponentially with various relaxation times specific to the sample under various conditions, such as in electrolyte solutions with structural viscous behavior and electrode materials with surface polymer layers, ranging from short to relatively long times.

Thus, the phenomenon of relaxation of the streaming potential in the present invention provides a means of directly observing the strain of the electric double-layer model and its relaxation, which was previously unknown.

Figure 14:
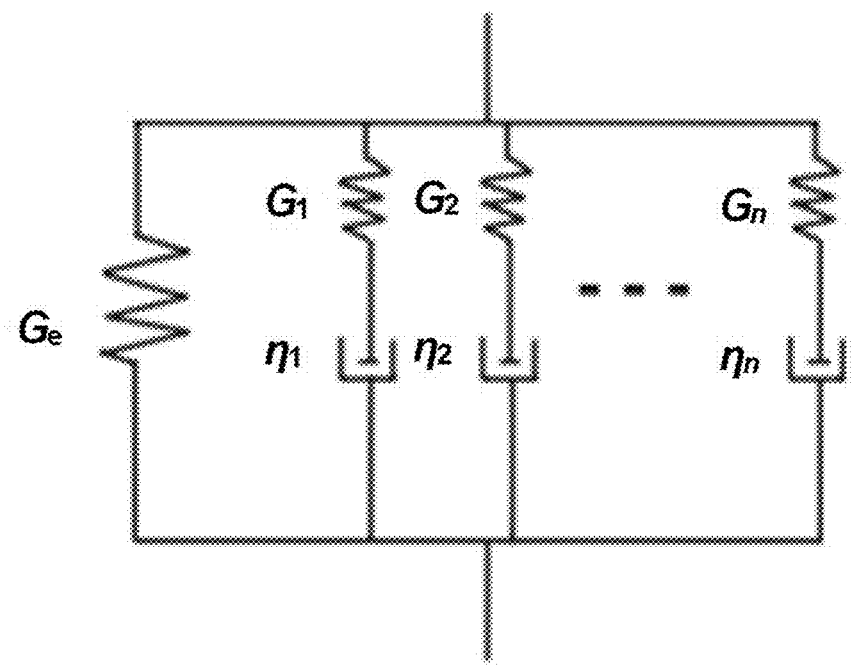
FIG. 14 shows a generalized Maxwell model for analyzing the relaxation phenomenon of streaming potential.

This is preferably done by performing an exponential function approximation using the Gauss-Newton approximation method as described in Example 1 above for the measured value of V(t). In the algorithm for measurement shown earlier, it is preferably done by using $V^\infty$, which is inductively estimated by a predetermined algorithm from the measured values during the transient response. In practice, the method estimates $V^\infty$ with a measurement time of approximately five times the relaxation time τ. With this method of measuring the streaming potential, it is possible to accurately describe the change in the measured streaming potential using the nonlinear least-squares approximation to a single exponential function, as described above. However, for more complex measurement systems, in addition to the approximation method using a single exponential function, it is preferable to use the nonlinear least-squares approximation for multiple exponential functions that are linked together to describe the change in the streaming potential. In the case of more complex measurement systems, in addition to a single exponential function approximation, a nonlinear least-squares approximation to multiple exponential functions is preferably used to describe changes in the streaming potential. In this case, it is sufficient to approximate the data series $(V_0, t_0)$, $(V_1, t_1)$, ..., and $(V_n, t_n)$ sampled at equal intervals using the difference method, using the following formula. This is equivalent to FIG. 14 as a dynamic model.

$$V_\infty + \Sigma_i C_i \exp(a_i t) \quad \text{[Equation 9]}$$

To illustrate the calculation method, first perform a least-squares approximation using only one exponential function term for $(V_0, t_0)$, $(V_1, t_1)$ and $(V_n, t_n)$. That is, $V_i = A \exp(a_i)$, (i=0, 1, 2, 3, ..., N), the relationships $V1 = V_0$, $V2 = e^a V_1$, and $V_n = e^a V_{n-1}$ are established. The following equation is used to find a that minimizes $Q = \Sigma(V_i - e^a V_{i-1})^2$ as the mean squared error.

[Equation 10]

$$\frac{\partial Q}{\partial a} = 2e^a \sum (V_i - e^a V_{i-1}) V_{i-1} = 0$$

This yields Formula 1 below, and thus Formula 2 below. The least-squares error for the coefficient A is obtained as Formula 3 below. From this, the least-squares approximation formula for $V_i = A \exp(a_i)$ was obtained using Formula 4 below.

[Equation 11]

$$e^a = \frac{\sum V_i V_{i-1}}{\sum V_{i-1}^2} \quad \text{(Formula 1)}$$

$$a = \ln\left(\sum V_i V_{i-1}\right) - \ln\left(\sum V_{i-1}^2\right) \quad \text{(Formula 2)}$$

$$\frac{\partial}{\partial A} \sum (V_i - A\exp(ai))^2 = 0 \quad \text{(Formula 3)}$$

$$A = \frac{\sum V_i \exp(ai)}{\sum \exp(2ai)} \quad \text{(Formula 4)}$$

Next, repeating the above method as Formula 5 below, Formulas 6 and 7 below are obtained. By repeating the above formulas, a least-squares approximation formula can be obtained as the sum of the exponential functions $V(t) = \Sigma C_i \exp(a_i t)$. In this case, the term corresponding to $V^\infty$ can be automatically calculated as the term where $a_i$ is as close to zero as possible.

[Equation 12]

$$Z_i = V_i - A\exp(ai) = B\exp(bi) \quad \text{(Formula 5)}$$

$$b = \ln\left(\sum Z_i Z_{i-1}\right) - \ln\left(\sum Z_i^2\right) \quad \text{(Formula 6)}$$

$$B = \frac{\sum Z_i \exp(bi)}{\sum \exp(2bi)} \quad \text{(Formula 7)}$$

In addition to the thin film materials in this example, samples measured by the streaming potential method are often measured flowing in the pores of porous materials such as powders and fibers. In such cases, it is known that the pore diameters show a diverse distribution from nano-order to milli-order. In addition, in the distribution of the electrolyte, there may be changes in the shape of the gas-liquid interface owing to the interface with the gas component remaining in the pore, and there may be a three-phase interface between the solid and liquid and gas. Thus, the potential fluctuation due to viscoelasticity alone is not necessarily the only factor causing relaxation phenomena, and unexpected transient responses may be observed. The present invention is applicable not only to relaxation changes that have a single relaxation time and are indicated by an exponential function but also to transient responses that are indicated by a mathematical formula, such as multiple exponential function terms according to the concept of the example, and where the relaxation time in each team can be empirically attributed to the factors of the respective relaxation phenomenon assumed.

(Comparison Example)

Figure 15:
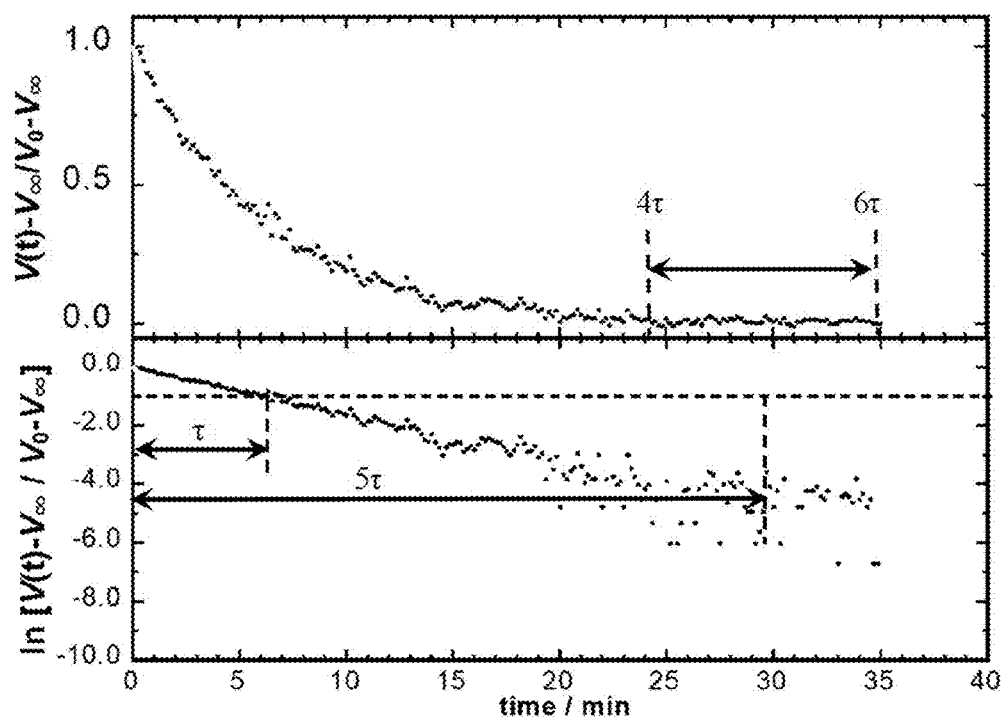
FIG. 15 shows a graph showing changes over time of normalized potential difference in $LiClO_4$-PC/solution (1 mol/L) at 700 mPa.

A comparative example of zeta potential measurements on the surface of lithium cobalt oxide membranes in non-aqueous media is described here. FIG. 15 shows the transient potential response in a PC solution of 1 mol/L $LiClO_4$.

The usual method of obtaining values during normal measurement of streaming potential is to set the pressure to the electrolyte solution circulating through the cell, wait until the potential becomes constant, and then continuously obtain values until it can be confirmed that the potential is constant, and then use the average of these values. In other words, as shown in FIG. 15, after confirming that the potential changes exponentially over time and becomes almost constant at around 4τ, the measurement is continued until 6τ to confirm that the value is constant, and the average value of the potential obtained during that time is obtained.

In the example of zeta potential measurement of lithium cobalt oxide membrane surface in non-aqueous medium shown in Example 4, the zeta potential was calculated from the potential under each predetermined pressure using the values up to the relaxation time, whereas in the comparative example, the regression curve indicated by the exponential function was not used and the average value of zeta potential from the time when the value became constant over time was obtained. The method of obtaining data is completely different from the present invention in that the average zeta potential is obtained from the point in time when the zeta potential becomes constant over time, instead of using an exponential regression curve in the comparative example. In this case, 5τ, or about 30 minutes, elapsed before a steady value was shown, suggesting that the values actually converge to the value calculated by the measurement up to τ. As a result, the value E/P and its correlation coefficient R after showing a steady value are shown in Table 1 below and compared with FIG. 11, the result of the regression calculation performed in this Example 4.

TABLE 1

| Number of sweeps | Example 4 (FIG. 11) | | Comparative example 1 | |
| --- | --- | --- | --- | --- |
| | E/P (mV/hPa) | R | E/P (mV/hPa) | R |
| 1st time | 41.852 | 0.99933 | 41.95 | 0.968 |
| 2nd time | 41.776 | 0.99958 | 43.86 | 0.974 |
| 3rd time | 41.829 | 0.99953 | 44.17 | 0.964 |
| 4th time | 41.78 | 0.99986 | 41.78 | 0.952 |

As a result, the approximate values in the one-logarithmic diagram in FIG. 15 differ under each pressure, and all the results show that the correlation of the data collected in Example 4, which has a high correlation in the measurement up to the relaxation time, is extremely superior. Therefore, not only was the measurement time reduced from 5τ to τ for the potential measurement under each pressure, but also the reproducibility of the values was improved in terms of R value from less than 0.98 or one significant digit in Comparative Example 1 to more than 0.999 or three significant digits in Example 4.

This is because, despite being a convergent value, the value fluctuates slightly, and dispersion of the value due to noise in the measured value is recognized from changes over time. This means that the zeta potential values calculated using values up to τ, which are shorter and relatively more accurate than those obtained by conventional methods, are significantly more accurate.

Example 5

<Example of Zeta Potential Measurement on the Surface of Lithium Cobalt Oxide Powder at Different Concentrations of Lithium Perchlorate Salt in Non-Aqueous Media>

Figure 16:
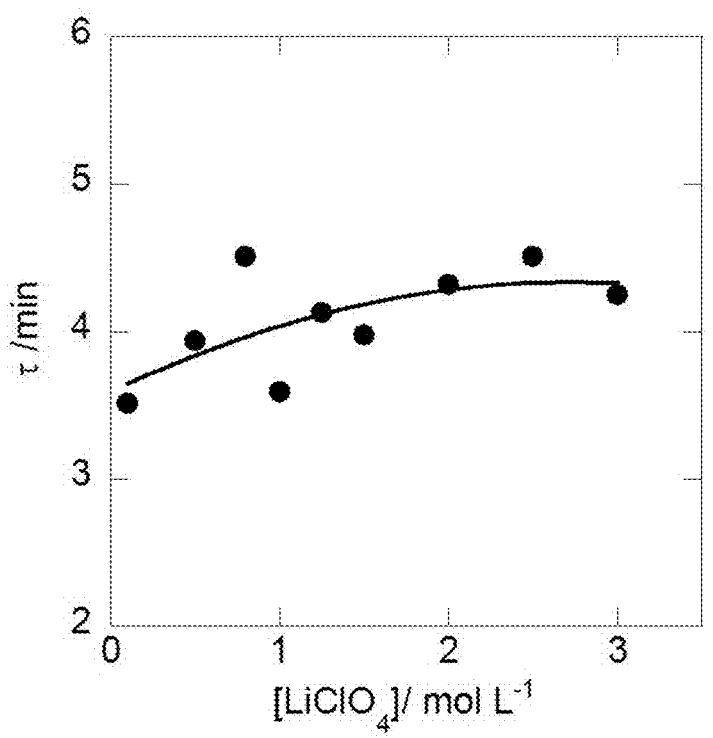
FIG. 16 shows a graph showing the relationship between the zeta potential of the lithium cobalt oxide powder surface when changing the lithium perchlorate concentration in the non-aqueous medium of Example 5.

The effect of varying the salt concentration on the zeta potential was investigated by measuring the streaming potential using a system in which $LiCoO_2$ powder was dispersed in PC and the concentration of lithium perchlorate in the PC solution was also varied in various ways. FIG. 16 shows that the relaxation time τ, calculated by exponential approximation using the displacement under constant pressure after changing the pressure from 600 hPa to 700 hPa during the streaming potential measurement at each salt concentration, was about 4 minutes and gradually increased with salt concentration.

Example 6

<Example of Zeta Potential Measurement of Lithium Cobalt Oxide Membrane Surface at Different Concentrations of Lithium Perchlorate Salt in a Non-Aqueous Medium>

Figure 17:
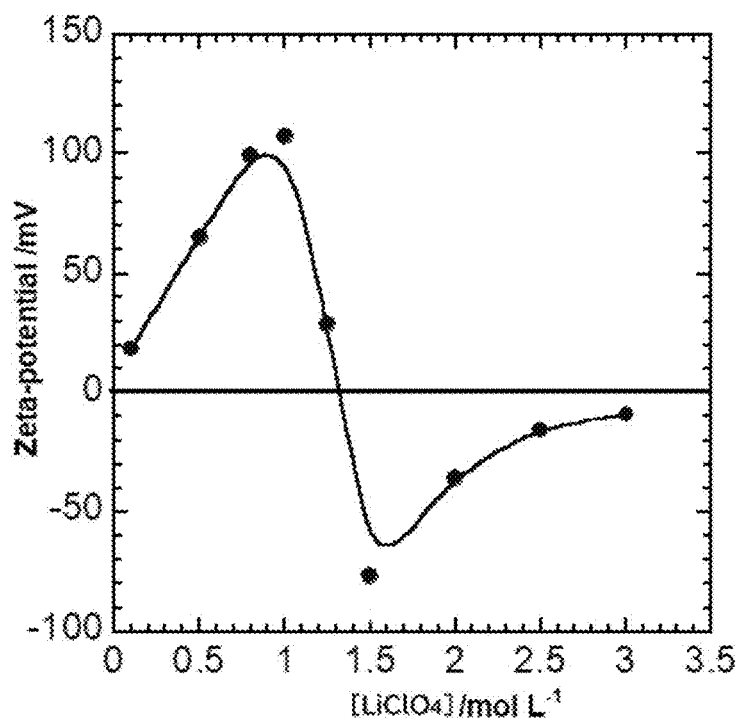
FIG. 17 shows a graph showing the zeta potential dependence of the lithium cobalt oxide membrane surface when changing the lithium perchlorate salt concentration in the non-aqueous medium of Example 6.

In Example 4, the concentration of lithium perchlorate dissolved in PC was varied from 0.1 mol/L to 3.0 mol/L to measure the streaming potential, and the results of the effect on the surface zeta potential for each salt concentration are shown in FIG. 17.

The potential on the $LiCoO_2$ membrane in aprotic solvents depends on the amount of Li or $ClO_4$ ions adsorbed, but since both ions do not show specific adsorption, the increase in potential in the concentration region up to 1 mol/L suggests that the adsorption of Li ions occurs preferentially. In this concentration region, Li ions show a solvation structure to the PC solvent, but their interaction with the solid phase is also relatively strong, which is consistent with the Raman and other measurements. However, in the concentration region above 1 mol/L, it is suggested that the interaction between Li ions and the solid is weakened owing to the excessive coordination of $ClO_4$ ions to Li, which partially faults ion pairs. This phenomenon is considered to be related to the sharp decrease in electrical conductivity from around 1.2 M. The reason for the large negative zeta potential values at high salt concentrations (~1.5 M) may be due to the intrinsic properties of the $LiCoO_2$ particles.

INDUSTRIAL APPLICABILITY

The present invention is useful for various solid surfaces because it can accurately measure zeta potential in various electrolyte solutions, both aqueous and non-aqueous, which exhibit a wide range of values for dielectric constant, electrical conductivity, viscosity, and other properties, and in a significantly shorter time compared to conventional methods. It is also useful for analyzing the viscoelastic properties of solid-liquid interfaces.

DESCRIPTION OF SYMBOLS

1 Zeta potential measurement device
10 Pressure regulator
11 Pressure reducing valve
12 Pressure gauge
13 Dry nitrogen gas cylinder
14 Three-way cock
15 Platinum wire
16 Gasket
17, 18 Reservoir
19 Cell
20 Pressure sensor
21 Electrometer

The invention claimed is:

1. A zeta potential measurement method for measuring a zeta potential of a sample surface using a streaming potential method, the method comprising:

changing an external pressure in a step-wise manner;

setting a pressure change profile that has a rising part or a falling part which is of a shorter time than a relaxation time τ required for a response for change in a streaming potential accompanying the change in external pressure, and a steady part in which pressure is held at a steady state for a time longer than the relaxation time τ; and calculating the zeta potential using an asymptotic value of the streaming potential extrapolated from a transient response of the streaming potential occurring from the pressure change profile.

2. The zeta potential measurement method according to claim 1, wherein the pressure change profile has at least two steps with a profile satisfying $0<t_1<\tau$ and $\tau<t_2<10\tau$ for the relaxation time τ, where $t_1$ is the time of the rising part or the falling part and $t_2$ is the time to hold the steady part.

3. The zeta potential measurement method according to claim 1, wherein the pressure change profile has at least two steps with a profile satisfying $0<t_1<\tau$ and $\tau<t_2<5\tau$ for the relaxation time τ, where $t_1$ is the time of the rising part or the falling part and $t_2$ is the time to hold the steady part.

4. The zeta potential measurement method according to claim 1, wherein a fluctuation width of a pressure in the steady part is suppressed within a range of ±5% with respect to a central value.

5. The zeta potential measurement method according to claim 1, wherein a fluctuation width of a pressure in the steady part is suppressed within a range of ±1% with respect to a central value.

6. The zeta potential measurement method according to claim 1, wherein the transient response of the streaming potential is approximated by a least-squares method using an exponential function, and the method calculates the zeta potential using an estimate of the streaming potential at infinite time.

7. The zeta potential measurement method according to claim 1, wherein the method calculates the zeta potential using at least four zeta potential measurement points.

8. A zeta potential measurement device for measuring a zeta potential of a sample surface using a relationship between an external pressure and a streaming potential, the device comprising:

a pressure adjustment unit that changes the external pressure in a step-wise manner; and a zeta potential calculation unit that sets a pressure change profile that has a rising part or a falling part which is of a shorter time than a relaxation time τ required for a responsive change in the streaming potential accompanying the change in external pressure, and a steady part in which pressure is held at a steady state for a time longer than the relaxation time τ, and calculates the zeta potential using an asymptotic value of the streaming potential extrapolated from a transient response of the streaming potential occurring from the pressure change profile.

9. The zeta potential measurement device according to claim 8, wherein the pressure change profile has at least two steps with a profile satisfying $0<t_1<\tau$ and $\tau<t_2<10\tau$ for the relaxation time τ, where $t_1$ is the time of the rising part or the falling part and $t_2$ is the time to hold the steady part.

10. The zeta potential measurement device according to claim 8, wherein the pressure adjustment unit adjusts a time required for the external pressure applied to a fluid inside a cell to rise or fall with a time constant smaller than the relaxation time τ.

11. The zeta potential measurement device according to claim 8, wherein the pressure adjustment unit adjusts a fluctuation width of a pressure in the steady part that maintains the pressure in a steady state for a time longer than the relaxation time τ within a range of ±5% with respect to a central value.

12. The zeta potential measurement device according to claim 8, wherein the transient response of the streaming potential is approximated by a least-squares method using an exponential function, and the device calculates the zeta potential using an estimate of the streaming potential at infinite time.

13. The zeta potential measurement device according to claim 8, wherein the device comprises a sample cell configured to contain a sample and a solution and to receive the external pressure.

14. The zeta potential measurement device according to claim 13, wherein the sample cell comprises an organic polymer material.

15. The zeta potential measurement device according to claim 13, wherein the sample cell comprises a translucent portion.

16. A zeta potential measurement device for measuring a zeta potential of a sample surface using a relationship between an external pressure and a streaming potential, the device comprising:

a pressure adjustment unit that changes the external pressure in a step-wise manner;

a sample cell configured to contain a sample and a solution and to receive the external pressure; and a zeta potential calculation unit that sets a pressure change profile that has a rising part or a falling part which is of a shorter time than a relaxation time τ required for a responsive change in the streaming potential accompanying the change in external pressure, and a steady part in which pressure is held at a steady state for a time longer than the relaxation time τ, and calculates the zeta potential using at least four zeta potential measurement points and an asymptotic value of the streaming potential extrapolated from a transient response of the streaming potential occurring from the pressure change profile.

17. The zeta potential measurement device according to claim 16, wherein the zeta potential calculation unit calculates the zeta potential using at least six zeta potential measurement points.

18. The zeta potential measurement device according to claim 16, wherein the sample cell is configured to contain a non-aqueous solution.

19. The zeta potential measurement device according to claim 16, wherein the sample cell is configured to contain an aqueous solution.

20. The zeta potential measurement device according to claim 16, wherein the zeta potential calculation unit calculates the zeta potential using multiple transient responses, multiple relaxation times, or both.

* * * * *